(12) United States Patent
Kim et al.

(10) Patent No.: US 10,185,868 B2
(45) Date of Patent: Jan. 22, 2019

(54) FINGERPRINT AUTHENTICATION SYSTEM AND METHOD OF AUTHENTICATION USING THE SAME

(71) Applicant: Samsung Electronics Co., Ltd., Suwon-si, Gyeonggi-do (KR)

(72) Inventors: Jongseok Kim, Hwaseong-si (KR); Kihong Min, Seoul (KR); Dohyoung Chung, Seoul (KR); Seokwhan Chung, Hwaseong-si (KR); Uin Chung, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 210 days.

(21) Appl. No.: 15/007,588

(22) Filed: Jan. 27, 2016

(65) Prior Publication Data
US 2016/0217314 A1 Jul. 28, 2016

(30) Foreign Application Priority Data
Jan. 28, 2015 (KR) .................. 10-2015-0013540

(51) Int. Cl.
*G06K 9/00* (2006.01)

(52) U.S. Cl.
CPC ....... *G06K 9/00087* (2013.01); *G06K 9/0002* (2013.01); *G06K 9/0008* (2013.01)

(58) Field of Classification Search
CPC ............. G06K 9/00087; G06K 9/0002; G06K 9/0008; G06K 9/00885; G09G 5/003; G09G 2370/16; G01N 29/36
See application file for complete search history.

(56) References Cited

U.S. PATENT DOCUMENTS

| 8,131,026 B2 | 3/2012 | Benkley et al. |
| 8,175,345 B2 | 5/2012 | Gardner |
| 8,204,281 B2 | 6/2012 | Satyan et al. |
| 8,229,184 B2 | 7/2012 | Benkley et al. |
| 8,315,444 B2 | 11/2012 | Gardner |
| 8,598,981 B2 | 12/2013 | Idsoe |
| 8,811,688 B2 | 8/2014 | Benkley et al. |
| 2003/0236120 A1* | 12/2003 | Reece ............ A63F 13/12 463/42 |

(Continued)

FOREIGN PATENT DOCUMENTS

| JP | 2006212269 A | 8/2006 |
| JP | 2009254584 A | 11/2009 |

(Continued)

*Primary Examiner* — Amir Alavi
(74) *Attorney, Agent, or Firm* — Harness, Dickey & Pierce, P.L.C.

(57) ABSTRACT

Provided is a fingerprint authentication system and a method of authentication. The fingerprint authentication system may have a configuration to analyze a reflection wave signal reflected at a surface of an object under examination or an internal of the object under examination by applying a wave signal from at least one of signal communication unit of a fingerprint sensor to the object under examination. In the method of authentication, the controller in the fingerprint authentication system may be configured to selectively perform a first step authentication to authenticate a shape of a fingerprint, and a second step authentication to detect internal biometric information of the object under examination.

12 Claims, 5 Drawing Sheets

(56) References Cited

U.S. PATENT DOCUMENTS

| | | | |
|---|---|---|---|
| 2006/0078177 A1* | 4/2006 | Niinuma | G06K 9/00087 |
| | | | 382/124 |
| 2007/0113276 A1* | 5/2007 | Shoji | G06F 8/61 |
| | | | 726/17 |
| 2007/0177766 A1* | 8/2007 | Kasahara | G06K 9/00993 |
| | | | 382/115 |
| 2007/0267478 A1* | 11/2007 | Turek | G06Q 20/28 |
| | | | 235/379 |
| 2009/0155456 A1 | 6/2009 | Benkley et al. | |
| 2010/0020205 A1* | 1/2010 | Ishida | G06T 5/008 |
| | | | 348/241 |
| 2012/0284572 A1* | 11/2012 | Shirakawa | G06F 17/30327 |
| | | | 714/54 |
| 2014/0043138 A1 | 2/2014 | Idsoe | |
| 2014/0043642 A1* | 2/2014 | Yasuoka | H04N 1/00854 |
| | | | 358/1.14 |
| 2014/0105469 A1 | 4/2014 | Setlak et al. | |
| 2014/0376029 A1* | 12/2014 | Itoh | G06K 15/005 |
| | | | 358/1.14 |
| 2016/0217314 A1* | 7/2016 | Kim | G06K 9/00087 |
| 2017/0185762 A1* | 6/2017 | Chang | G06F 21/32 |
| 2017/0193314 A1* | 7/2017 | Kim | G06K 9/00885 |

FOREIGN PATENT DOCUMENTS

| | | |
|---|---|---|
| KR | 20090065026 A | 6/2009 |
| KR | 20130060875 A | 6/2013 |

* cited by examiner

FINGERPRINT AUTHENTICATION SYSTEM AND METHOD OF AUTHENTICATION USING THE SAME

RELATED APPLICATION

This application claims the benefit of Korean Patent Application No. 10-2015-0013540, filed on Jan. 28, 2015, in the Korean Intellectual Property Office, the disclosure of which is incorporated herein in its entirety by reference.

BACKGROUND

1. Field

Example embodiments relate to a fingerprint authentication system and a method of authenticating an object under examination by using the fingerprint authentication system.

2. Description of the Related Art

Along with the global economic and social developments, methods of payment for purchased goods have been gradually developed. As a result, new payment methods, such as use of credit cards and e-money, have appeared. However, the management of personal information has become a social issue, and a conventional method of inputting an ID and password is no longer sufficient for authenticating personal information and keeping it safe and secure.

Accordingly, under a circumstance that personal information is needed while keeping the personal information, there is a need to detect and to decode a specific signal. In a security system, an authentication system in which biometric features of a person are recognized, and compared with data stored in advance has been mainly used. Of the authentication method by using the biometric features of a person, the fingerprint authentication system is commonly used. The fingerprint authentication system has some advantages, such as readiness to use, accuracy, price, and effect, etc.

A fingerprint recognition system generally includes a fingerprint recognition sensor and a signal processing algorithm. In a general security authentication system, an authentication is performed such that, after recognizing the shape of a surface of an object to be identified, the shape of the surface is compared with biometric data stored in advance. Recently, various hacking techniques have been appeared, thus, a personal information security system with higher level of security than the security system of the related art is needed.

SUMMARY

Example embodiments relate to a fingerprint authentication system and a method of authenticating an object under examination by using the fingerprint authentication system.

Provided are fingerprint authentication systems measuring a fingerprint of a surface and internal biometric information of an object under examination.

Provided are methods of authenticating including a stepwise authentication of identity of the object under examination.

Additional aspects will be set forth in part in the description which follows and, in part, will be apparent from the description, or may be learned by practice of the presented example embodiments.

According to example embodiments, a fingerprint authentication system includes a fingerprint sensor configured to apply wave signals to an object under examination, and to receive wave signals reflected from the object under examination; a controller configured to control an operation of the fingerprint sensor, and to analyze reflection wave signals of the object under examination received from the fingerprint sensor; and a storage unit configured to store information of the object under examination.

The fingerprint sensor may include at least one signal communication unit configured to contact the object under examination, and to apply a wave signal to the object under examination; a signal application electrode configured to transmit the wave signal to the at least one signal communication unit; and a signal receiving electrode configured to receive the wave signal that is reflected by the object under examination, and to transmit to the at least one signal communication unit.

The fingerprint sensor may further include a passivation layer to contact or not to contact a fingerprint region of the object under examination on the at least one signal communication unit.

The at least one signal communication unit may have a width smaller than a width between ridge regions, the ridge regions are protruded regions of a fingerprint.

The wave signal applied to the object under examination from the at least one signal communication unit may have an ultrasonic wave characteristic or a radiofrequency (RF) characteristic.

According to example embodiments, a method of authenticating an object under examination, the method includes: recognizing a fingerprint of the object under examination; and performing at least one of a first step authentication to authenticate a shape of the fingerprint, and a second step authentication to detect internal biometric information of the object under examination.

The recognizing of the fingerprint of the object under examination may include measuring a reflection wave signal reflected from the object under examination by applying a wave signal to the object under examination.

The method of authenticating the object under examination may further include pattern processing a pattern of the fingerprint to simplify the shape of the fingerprint of the object under examination by using the reflection wave signal measured on only fingerprint region of the object under examination.

The pattern processing may include one or more of smoothing, binarization, and thinning the pattern.

The second step authentication may be performing an authentication by measuring a reflection wave signal from an internal of the object under examination after applying a wave signal to the object under examination.

The reflection wave signal may be a wave signal reflected at blood vessels, bones, or fat of the internal of the object under examination.

Performing of the second step authentication may include: detecting internal biometric information of the object under examination by using the reflection wave signal reflected from the internal of the object under examination; and comparing a data set configured by coding wave signal patterns using the reflection wave signals with a data set stored in a storage unit.

The second step authentication may be performed with respect to feature points of the fingerprint region of the object under examination.

The feature points are one or more of ridge, valley, ending point, bifurcation, upper core, lower core, or lift (right delta) of the fingerprint.

The method of authenticating the object under examination may further include determining whether the object under examination is authenticated by using one of the first step authentication and the second step authentication or both of them.

The determining whether the first step authentication and the second step authentication or both of them may include: performing only the second step authentication; and measuring biometric information of an internal of the fingerprint of the object under examination in the operation of recognizing the fingerprint of the object under examination.

The determining whether the first step authentication and the second step authentication or both of them may include: sequentially performing both the first step authentication and the second step authentication; and performing the second step authentication only when the first step authentication is successful.

BRIEF DESCRIPTION OF THE DRAWINGS

Example embodiments will be more clearly understood from the following detailed description taken in conjunction with the accompanying drawings. FIGS. 1-7 represent non-limiting, example embodiments as described herein.

DETAILED DESCRIPTION

Reference will now be made in detail to example embodiments, examples of which are illustrated in the accompanying drawings. However, specific structural and functional details disclosed herein are merely representative for purposes of describing example embodiments. Example embodiments may, however, be embodied in many alternate forms and should not be construed as limited to only the embodiments set forth herein.

In the drawings, the sizes of constituent elements may be exaggerated for clarity and explanation convenience, and like reference numerals refer to like elements throughout.

Although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," if used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Example embodiments relate to a fingerprint authentication system and a method of authenticating an object under examination by using the fingerprint authentication system.

Figure 1A:
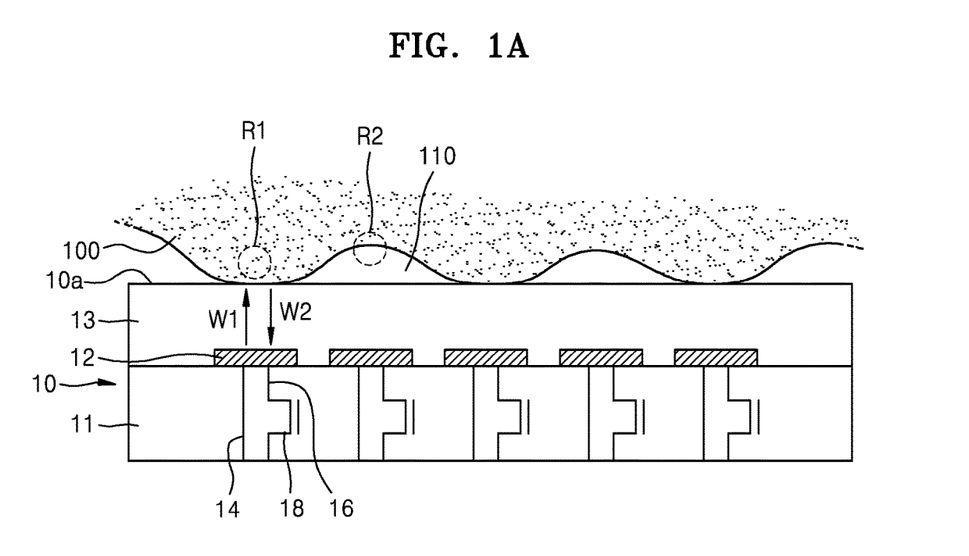
FIG. 1A is a schematic cross-sectional view of a fingerprint sensor according to example embodiments.

FIG. 1A is a schematic cross-sectional view of a fingerprint sensor according to example embodiments.

Referring to FIG. 1A, a fingerprint sensor 10 according to an example embodiments includes at least one signal communication unit 12 for applying a wave signal W1 to an object 100 under examination, and signal application electrodes 14 that are electrically connected to each of the signal communication units 12. The wave signal W1 applied to the object 100 under examination is reflected by a surface or an internal of the object 100 under examination, and is received by the signal communication unit 12 as a reflected wave signal W2. Also, the fingerprint sensor 10 may include signal receiving electrodes 16 configured to receive the reflected wave signal W2. The wave signal W2 reflected by the object 100 under examination is received by the signal communication unit 12, and is transmitted to a controller through the signal receiving electrodes 16. In this process, the wave signal W2 may pass through a thin film transistor (TFT) 18 or a signal amplifier.

In the example embodiments, the object 100 under examination may be a part of a human body, for example, a fingerprint region. The object 100 under examination may include ridge regions R1 which are relatively protruding regions than peripheral skin regions and valley regions R2 which are regions between the ridge regions R1. When the ridge region R1 of the object 100 under examination contacts a surface 10*a* of the fingerprint sensor 10 corresponding to the signal communication unit 12 of the fingerprint sensor 10, the valley region R2 may not directly contact the surface 10*a* of the fingerprint sensor 10, and the valley region R2 may be separated from the fingerprint sensor 10. When the ridge region R1 is in contact with the surface 10*a* of the fingerprint sensor 10, an empty space 110 between the valley region R2 and the fingerprint sensor 10 may be an empty space filled with air or filled with sweat or an impurity discharged from the object 100 under examination.

The signal application electrodes 14 and the signal receiving electrodes 16 of the fingerprint sensor 10 according to example embodiments may be formed of a metal, an alloy, a conductive metal oxide, a conductive metal nitride, or a conductive polymer. The signal application electrodes 14, the signal receiving electrodes 16, and the TFT 18 may be formed in an insulating layer 11. The insulating layer 11 may be formed of silicon oxide, silicon nitride, or silicon polymer, etc. The signal communication unit 12 may be a conductive material layer formed of a conductive material, for example, a metal, an alloy, a conductive metal oxide, a conductive metal nitride, or a conductive polymer. A passivation layer 13 may be formed on the insulating layer 11 and the signal communication unit 12. The passivation layer 13 may be formed of an organic material, a polymer, silicon oxide, silicon nitride, etc. The signal communication unit 12 may constitutes the surface 10a of the fingerprint sensor 10, and may contact the object 100 under examination by exposing to the outside of the fingerprint sensor 10.

The fingerprint sensor 10 according to the example embodiments may include a plurality of signal communication units 12. A width of the signal communication unit 12 or a gap between the signal communication units 12 may be smaller than the width and the gap of the ridge regions R1 and the valley regions R2 of the object 100 under examination. For example, the width of the signal communication unit 12 or a gap between the signal communication units 12 may be formed to have a few micrometers to a few hundreds of micrometers.

Figure 1B:
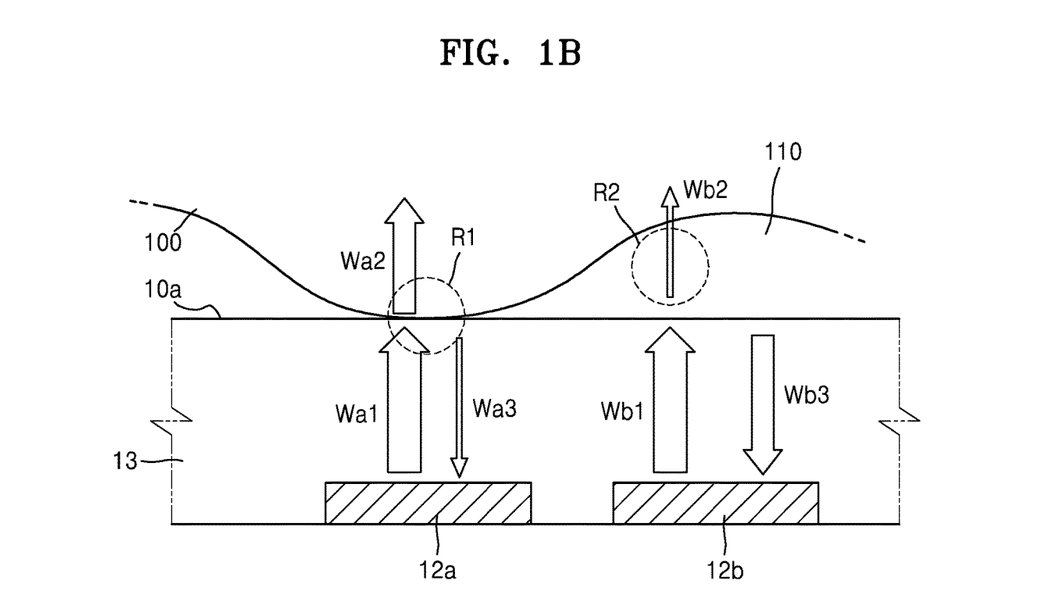
FIG. 1B is a drawing showing the characteristic of a wave signal according to a part of an object under examination of example embodiments.

FIG. 1B shows the characteristic of a wave signal according to a part of an object under examination of example embodiments.

Referring to FIGS. 1A and 1B, when the surface 10a of the fingerprint sensor 10 contacts the object 100 under examination, a wave signal Wa1 may be applied to the object 100 under examination from a signal communication unit 12a. In the ridge region R1 of the object 100 under examination that directly contacts the surface 10a of the fingerprint sensor 10, the majority of wave signal Wa2 of the wave signal Wa1 may pass through the surface 10a of the fingerprint sensor 10 and a portion of wave signal Wa3 may be reflected at a surface of the ridge region R1. The wave signal Wa2 that passes through the surface of the ridge region R1 of the object 100 under examination is reflected at an internal of the object 100 under examination and may return to the signal communication unit 12 or may be absorbed in the object 100 under examination.

A wave signal Wb1 may be applied to the valley region R2 of the object 100 under examination that is not in contact with the surface 10a of the fingerprint sensor 10 from a signal communication unit 12b. Of the wave signal Wb1 that is applied to the valley region R2 of the object 100 under examination, the wave signal Wb3 is reflected at a boundary between the surface 10a of the fingerprint sensor 10 and the empty space 110, and is received by the signal communication unit 12b. Also, some of the wave signal Wb2 may proceed into the object 100 under examination passing through the empty space 110.

The wave signal W2 may include a wave signal reflected at an interface between the surface 10a of the fingerprint sensor 10 and the object 100 under examination, a wave signal reflected at an interface between the surface 10a of the fingerprint sensor 10 and the empty space 110, and a wave signal reflected at bones, blood vessels, fat, or textures of the object 100 under examination. The measuring time of the reflected wave signal W2 may be changed according to the reflection points, where the wave signal W1 applied to the object 100 under examination from the signal communication units 12, 12a, and 12b is reflected. The reflected wave signal W2 is received by the signal communication units 12, 12a, and 12b and is transmitted to the TFT 18 or the amplifier where the wave signal W2 may be amplified.

The wave signal W1 applied to the object 100 under examination may have a ultrasonic wave characteristic, with ultrasonic wave or an optical ultrasonic wave or may have a radiofrequency (RF) characteristic. When the wave signal W1 is applied to the object 100 under examination, the wave signal W1 may be reflected at the surface of the object 100 under examination, peripherals of the object 100 under examination, such as, bones, blood vessels, fat, or textures of the object 100 under examination, and a part of the object 100 under examination where an acoustic impedance difference occurs.

Figure 2:
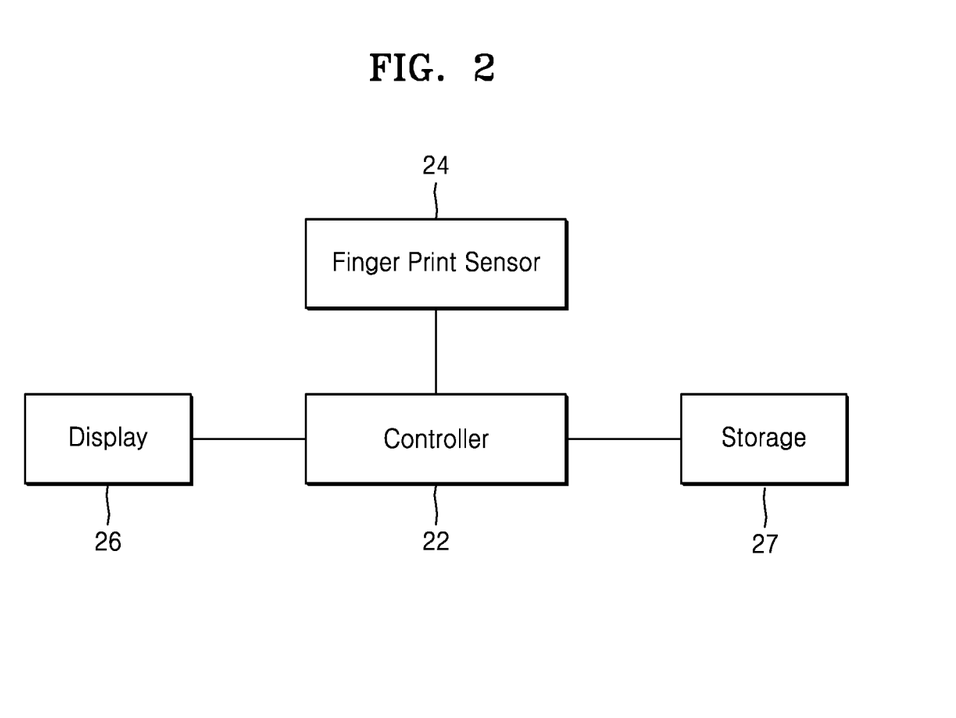
FIG. 2 is a block diagram of a fingerprint authentication system according to example embodiments.

FIG. 2 is a block diagram of a fingerprint authentication system according to example embodiments.

Referring to FIGS. 1A and 2, a fingerprint authentication system according to example embodiments may include a controller 22, a fingerprint sensor 24, a display 26, and a storage unit 27.

In at least some example embodiments, the fingerprint sensor 24 may be embodied as the fingerprint sensor 10.

The controller 22 controls an operation of the fingerprint sensor 24.

The controller 22 may include a processor and a memory (not shown).

The memory may be a nonvolatile memory device, for example, a read only memory (ROM), a programmable ROM (PROM), an electrically programmable ROM (EPROM), an electrically erasable and programmable ROM (EEPROM), a flash memory device, a phase-change RAM (PRAM), a magnetic RAM (MRAM), a resistive RAM (RRAM), a ferroelectric RAM (FRAM), and so on. The storage unit 27 may be embodied as memory. The processor may be a microprocessor, a digital signal processor, a microcontroller, application-specific-integrated-circuits (ASICs), field programmable gate arrays (FPGAs), or a similar device.

The memory may contain computer readable code that, when executed by the processor, configures the processor to apply the wave signal W1 to the object 100 under examination or analyze the reflected wave signal W2 received from the fingerprint sensor 24. Also, the controller 22 may authenticate the object 100 under examination from an analyzed result of the reflected wave signal W2, and may display the authenticating result with respect to the object under examination. Various data, such as fingerprint data of the object 100 under examination and the result of the authentication may be stored in the storage unit 27. When data with respect to the object 100 under examination is not included in the storage unit 27, fingerprint information of the object 100 under examination measured for the first time may be stored in the storage unit 27 together with personal information of the object 100 under examination.

Figure 3:
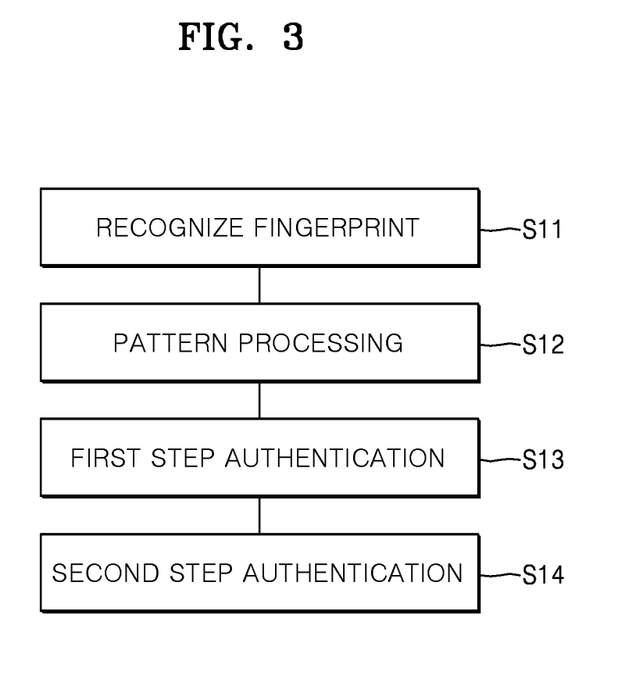
FIG. 3 is a flow chart of a method of authenticating an object under examination, according to example embodiments.

FIG. 3 is a flow chart of a method of authenticating an object under examination, according to example embodiments.

Referring to FIG. 3, in operation S11, the fingerprint sensor 10 may recognize a fingerprint of the object 100 under examination. For example, after seating the fingerprint part of the object 100 under examination on the surface 10a of the fingerprint sensor 10 according to example embodiments of FIG. 1A, a wave signal W1 having an ultrasonic characteristic is applied to the object 100 under examination through the signal communication unit 12. The wave signal W1 may be reflected at an interface between the surface 10a of the fingerprint sensor 10 and the object 100 under examination, at an interface between the surface 10a of the fingerprint sensor 10 and the empty space 110, and bones, blood vessels, fat, or textures in the object 100 under examination, and may return to the signal communication unit 12 as a reflection wave signal W2. Bio information, a pattern of a fingerprint, may be authenticated by using the reflection wave signal W2 obtained through the at least one signal communication unit 12.

In operation S12, the controller 22 may pattern process the fingerprint information of the authenticated object 100 under examination. The pattern processing is a process of simplifying the fingerprint pattern of the object 100 under examination from the reflection wave signal W2 obtained from the object 100 under examination. The pattern processing may include, for example, smoothing, binarization, and thinning. The smoothing is a process of removing noise from the reflection wave signal W2 by using a filter. The binarization is a process of distinguishing ridge regions R1 of a fingerprint part of the object 100 under examination and valley regions R2, regions between the ridge regions R1, to black and white. The thinning is a process of forming line widths appearing as the ridge region R1 and the valley region R2 of the fingerprint part of the object 100 under examination to a one pixel width.

Figure 4:
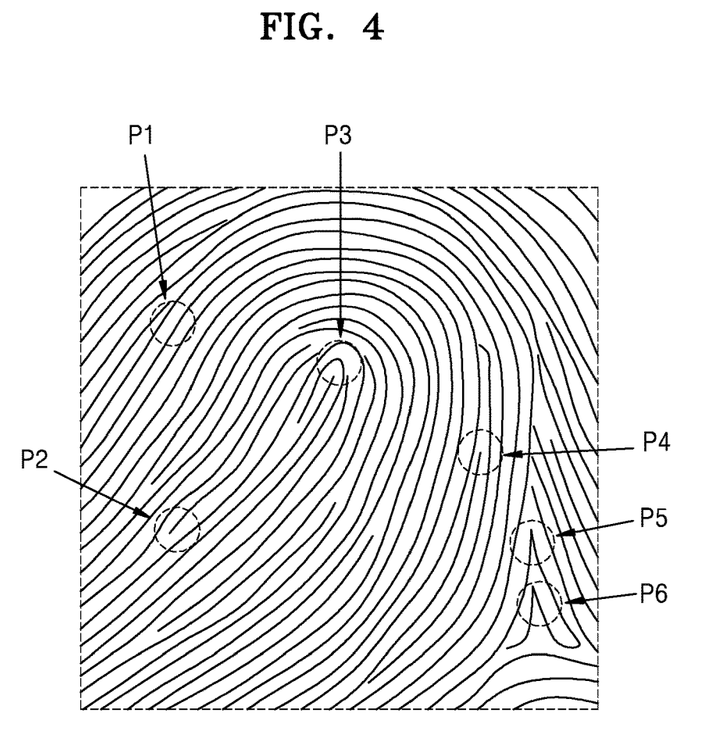
FIG. 4 is a schematic drawing of a fingerprint of an object under examination and feature points included in the fingerprint.

The controller 22 may formalize, as data, feature points appearing on the fingerprint of the object 100 under examination. In the fingerprint, ridge, valley, ending point, bifurcation, upper core, lower core, or lift or right delta may be determined as the feature points. The ending point denotes an end point of the ridge region, and the bifurcation denotes a point where the ridge region is divided. The upper core denotes a region where the fingerprint is curved upward the most, and the lower core is a region where the fingerprint is curved downward the most. FIG. 4 is a schematic drawing of a fingerprint of an object 100 under examination and the feature points included in the fingerprint. Referring to FIG. 4, various feature points may be included in a fingerprint of the object 100 under examination. Herein, for example, P1, P2, P3, P4, P5, and P6 may be referred to as the feature points. However, the feature points are not limited thereto.

In operation S13, the controller 22 may perform a first authentication operation after formalizing the feature points of a fingerprint of the object 100 under examination as data by using fingerprint information of the object 100 under examination through the pattern processing.

The controller 22 may perform the first authentication operation (S13) by comparing the data with fingerprint data of the object 100 under examination stored in advance. In the first step authentication, an identity of the object 100 under examination may be authenticated by comparing the surface shape of the fingerprint of the object 100 under examination.

As described above, a stored fingerprint data of the object 100 under examination and a measured fingerprint data of the object 100 under examination may be compared to each other.

If the controller 22 determines in operation S13, that the two fingerprint data are identical, the controller 22 may perform a second step authentication in operation S14. Operation 314 will be described in more detail below with reference to FIG. 4.

For example, although the controller 22 may determine that the two fingerprint data is similar to each other as the result of the first step authentication (S13), the identity of the object 100 under examination may not be authenticated. For example, the fingerprint authentication system configured to authenticate an object under examination by simply comparing the shape of the fingerprint may be incapacitated by reproducing the shape of the fingerprint of the object 100 under examination by forging the fingerprint.

Accordingly, in the fingerprint authentication system according to example embodiments, the controller 22 may perform the second step authentication (S14). Thus, the reliability of the fingerprint authentication system and the authentication method may be greatly increased. However, rather than performing both the first step authentication (S13) and the second step authentication (S14) for every authentication, the controller 22 may selectively perform both the first step authentication (S13) and the second step authentication (314) according to the degree of security.

Figure 5:
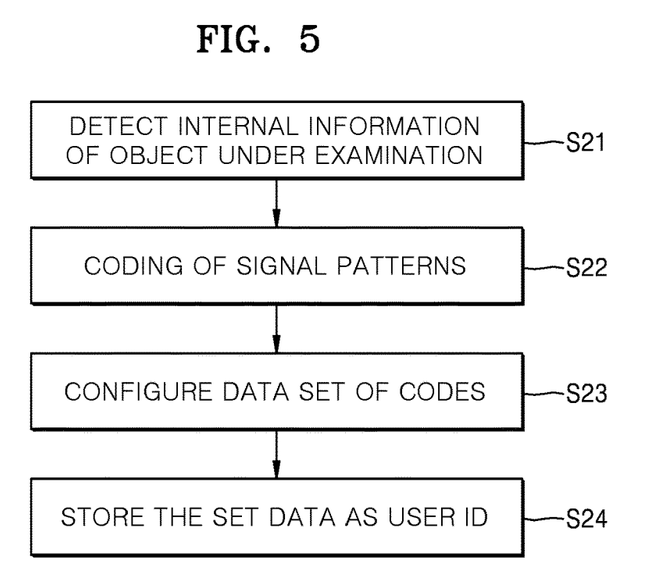
FIG. 5 is a flow chart of a method of a second step authentication by using biometric information of an object under examination in the authentication method according to example embodiments.

FIG. 5 is a flow chart of a method of a second step authentication by using biometric information of an object under examination in an authentication method according to example embodiments.

Referring to FIG. 5, a second step authentication, performed by controller 22, may include an operation of detecting internal information of the object 100 under examination. Here, the internal information of the object 100 under examination may be a biometric information of an internal surface including information about blood vessels, fat, or bones of the object 100 under examination. The internal information of the object 100 under examination may be detected from the whole or a part of the fingerprint region of the object 100 under examination. For example, the second step authentication (S14) may be performed by detecting internal information of feature points of the region of the fingerprint region. Internal biometric information of the object 100 under examination may be extracted at the feature points of P1 through P6 in the fingerprint pattern of FIG. 4. The measurement of biometric information will be described with reference to FIGS. 6 and 7.

Figure 6:
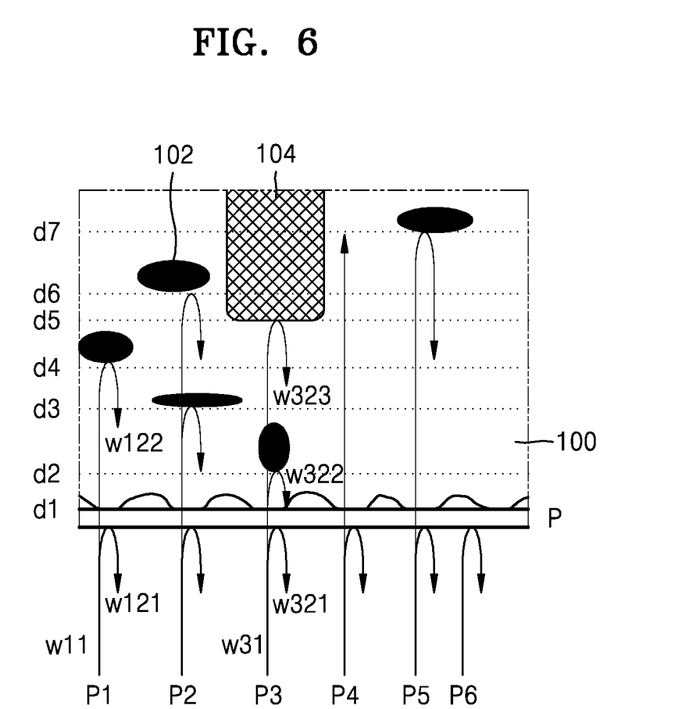
FIG. 6 is a graph showing a measurement of internal biometric information of an object under examination by irradiating a wave signal onto the object under examination.

FIG. 6 is a graph showing a measurement of internal biometric information of an object under examination by a wave signal that is irradiated on an object under examination.

Referring to FIG. 6, blood vessels 102 and bones 104 may be present in a fingerprint region of the object 100 under examination. The at least one of the signal communication unit 12 of the fingerprint sensor 24 irradiates an ultrasonic wave on the object 100 under examination. An ultrasonic wave may be reflected at a surface of the object 100 under examination and the blood vessels 102 and the bones 104 of an internal of the object 100 under examination. For example, when a wave signal W11 having an ultrasonic characteristic is irradiated on the feature point P1 which is one of the feature points P1 through P6 of the fingerprint region of the object 100 under examination, a portion of the wave signal W11 may be reflected at the surface of the object 100 under examination, and a remaining portion of the wave signal W11 may pass through the surface of the object 100 under examination. The wave signal W11 that passes through the surface of the object 100 under examination may be reflected at the walls of the blood vessels 102 of the object 100 under examination. At the feature point P1, the wave signal W11 reflected by the surface of the object 100 under examination may be referred to as a wave signal W121, and the wave signal W11 reflected by the blood vessels 102 of the internal of the object 100 under examination may be referred to as a wave signal W122. Also, when a wave signal W31 having an ultrasonic characteristic is irradiated on the feature point P3 which is one of the feature points P1 through P6 of a fingerprint region of the object 100 under examination, a portion of the wave signal W31 may be reflected at the surface of the object 100 under examination, and a remaining portion of the wave signal W31 may pass through the surface of the object 100 under examination, and may be reflected at the blood vessels 102 and bones 104 of the internal of the object 100 under examination. At the feature point P1, the wave signal W31 reflected by the surface of the object 100 under examination may be referred to as a wave signal W321, the wave signal W31 reflected by the blood vessels 102 of the internal of the object 100 under examination may be referred to as a wave signal W322, and the wave signal W31 reflected by the bones 104 of the internal of the object 100 under examination may be referred to as a wave signal W323.

In the internal of the object 100 under examination, the distribution of the blood vessels, bones, and fat corresponding to the feature points P1 through P6 of the fingerprint of the object 100 under examination may be different from each other. At the feature points P1 through P6, depths to the formation locations of the blood vessels, bones, or fats in the internal of the object 100 under examination from the surface of the object 100 under examination may be respectively expressed as d1 through d7, and the measuring time of the reflected wave signals having an ultrasonic characteristic may be different from each other.

Figure 7:
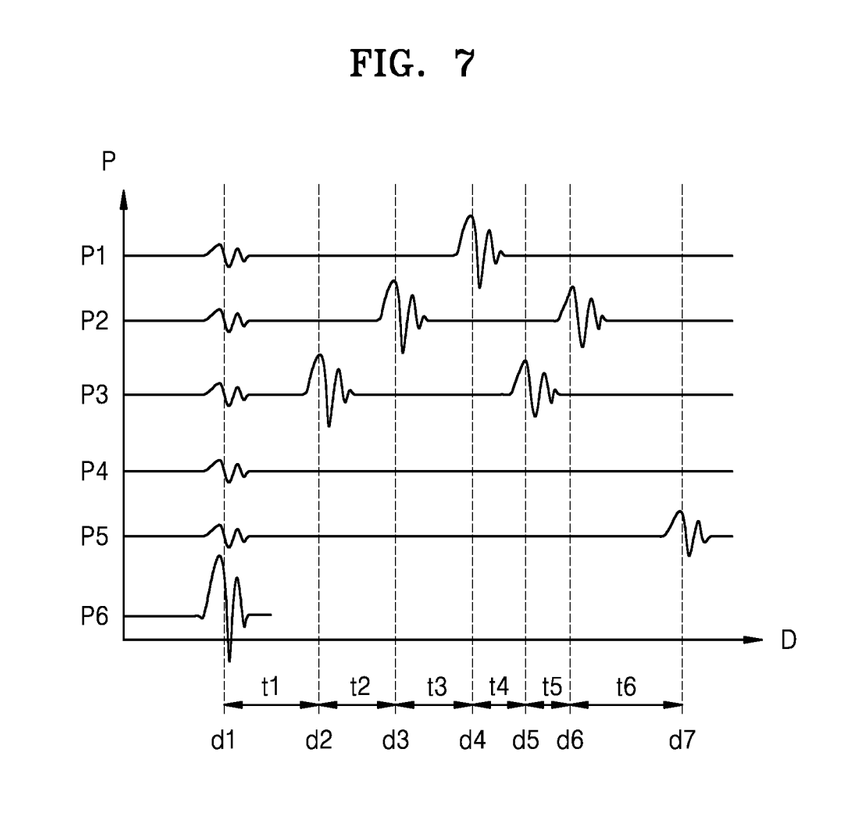
FIG. 7 is a graph showing wave signal patterns reflected at the feature points of an object under examination when a wave signal is irradiated onto the feature points of the object under examination of example embodiments.

FIG. 7 is a graph showing wave signal patterns reflected at the feature points of an object under examination when a wave signal is irradiated onto the feature points of the object under examination of example embodiments.

Referring to FIG. 7, waveforms are shown by detecting wave signals respectively reflected at the surface of the object 100 under examination and blood vessels, bones, and fat of the internal of the object 100 under examination when wave signals having ultrasonic wave characteristic from the at least one signal communication unit 12 of the fingerprint sensor 24 are irradiated onto the feature points P1 through P6 of the fingerprint region of the object 100 under examination. The waveform of the wave signal may be changed according to whether a material having an acoustic impedance difference is included in the object 100 under examination or not. Some of the irradiated wave signal from the at least one signal communication unit 12 of the fingerprint sensor 24 may be reflected at the surface of the object 100 under examination. Times (t1 through t6) when the reflected wave signals are measured may differ according to the locations of the blood vessel, bone, and fat of the internal of the object 100 under examination corresponding to the feature points P1 through P6 of the fingerprint region of the object 100 under examination. For example, a time difference between the location d1 and d2 is 0, and a time difference between the location d2 and d3 is t2. It is seen that, at the location d1 of the surface of the object 100 under examination, some portions of the wave signals irradiated on all feature points are reflected at the surface of the object 100 under examination. Herein the feature points may be the ridge regions R1 of the object 100 under examination of FIG. 1. However, if it is a valley region R2 like P6, most of the wave signal may be reflected at the surface of the object 100 under examination.

When performing the first step authentication operation S13 shown in FIG. 3, the controller 22 may use the wave signal reflected at the location d1 to the surface of the object 100 under examination.

When performing the second step authentication operation S14, the controller 22 may use the wave signals reflected at the depths of locations d2 through d7 of the object 100 under examination. For example, when performing the second step authentication (S14), the controller 22 may use biometric information of an inner side of the surface, depths of locations d2 through d7, of the object 100 under examination at the feature points P1 through P6 of the object 100 under examination. For example, a wave signal from the at least one signal communication unit of fingerprint sensor is applied to obtain information at the location d1 of the surface of the object 100 under examination, and a wave signal from the at least one signal communication unit of fingerprint sensor is applied to obtain biometric information at the locations d2 through d7 in internal of the object 100 under examination may differ.

For example, a first wave signal from the at least one signal communication unit of fingerprint sensor may be irradiated to perform the first step authentication (S13) of FIG. 3; some feature points may be set in a fingerprint region of the object 100 under examination by irradiating the first wave signal on the entire fingerprint region of the object 100 under examination; and internal biometric information of the object 100 under examination may be obtained by applying a second wave signal on the set feature points. Also, surface and internal biometric information of the object 100 under examination may be simultaneously obtained by applying the first wave signal from the at least one signal communication unit of fingerprint sensor on the entire fingerprint region of the object 100 under examination. When the surface and internal biometric information of the object 100 under examination are simultaneously obtained, the controller 22 may perform the first step authentication (S13) in advance with the surface information of the object 100 under examination, and after passing through the first step authentication (S13), the controller 22 may perform the second step authentication (S14) in which the internal information is compared.

Referring to FIG. 5, the controller 22 may code a signal pattern coded (S22) by using the wave signal reflected from the internal of the object 100 under examination to obtain internal information of the object 100 under examination. For this purpose, to remove noise component of the wave signal reflected from the internal of the object 100 under examination, signal components having a size smaller than a set size may be removed. As depicted in FIG. 7, the wave signals, from the at least one signal communication unit of the fingerprint sensor, reflected at the feature points P1 through P6 may have different waveforms from each other according to the depths d2 through d7 in the object 100 under examination. Signal waveforms having amplitudes less than a set range are determined as noise, thus, are filtered. The set range may vary according to power and application time of the wave signal and may be arbitrarily set. In coding (S22) the signal pattern by the controller 22, for example, a reflection wave signal having amplitude greater than a set range is referred to as "1", and a reflection wave signal having amplitude less than a set range is referred to as "0", Also, the coding may be performed in an opposite direction, and there is no specific limitation. The coding of the signal patterns according to the depths d1 through d7 in the object 100 under examination may be performed at the feature points P1 through P6 of the fingerprint region of the object 100 under examination to correspond to the graph of FIG. 7, and Table 1 summarizes the result.

TABLE 1

|  | | | | | | | |
|---|---|---|---|---|---|---|---|
| P1 | 0 | 0 | 0 | 1 | 0 | 0 | 0 |
| P2 | 0 | 0 | 1 | 0 | 0 | 1 | 0 |
| P3 | 0 | 1 | 0 | 0 | 1 | 0 | 0 |
| P4 | 0 | 0 | 0 | 0 | 0 | 0 | 0 |
| P5 | 0 | 0 | 0 | 0 | 0 | 0 | 1 |
| P6 | 1 | — | — | — | — | — | — |
| depth(D) | d1 | d2 | d3 | d4 | d5 | d6 | d7 |
| time | 0 | t1 | t2 | t3 | t4 | t5 | t6 |

The feature points P1 through P5 of the fingerprint region of the object 100 under examination are indicated as "0", and the feature point P6 of the fingerprint region of the object 100 under examination is indicated as "1". As depicted in FIG. 7, since the signal waveform at the depth d1 of the feature points P1 through P5 is relatively small, the signal waveform is treated as "0" by filtering. Since a reflection wave signal of the object 100 under examination is not detected at the depths d2 through d7 of the feature point P6, may be expressed as "–" or "0".

In this manner, after coding (S22) signal patterns according to the depths d1 through d7 at the feature points P1 through P6 of the internal of the object 100 under examination, the controller 22 may configure a data set (S23) at the feature points P1 through P6 by combining coded data. The data set may be configured in various types according to various standards. Examples of configuring method of the data set are as follows.

First; the controller 22 may configure a data set of codes "1" by reading only coding value "1" of coding values of the signal pattern at each of the feature points. For example, a data set of P1(d4), P2(d3, d6), P3(d2, d5), P5(d7), and P6(d1) may be configured.

Second, the controller 22 may configure a data set of codes "0" by reading only coding value "0" of coding values of the signal pattern at each of the feature points. For example, a data set of P1(d1~d3, d5~d7), P2(d1, d2, d4, d5, d7), P3(d1, d3, d4, d6, d7), P4(d1~d7), P5(d1~d6), and P6(d2~d7 or none) may be configured. If there is excessive data to be included in a data set, the data may be set by reading a portion of the data.

Third, the controller 22 may configure a data set by reading coding values of "0" and coding values of "1" of the signal pattern at each of the feature points. The method of combining of a data set is not specifically limited.

The controller 22 may configure the signal pattern code values (S23) at the feature points P1 through P6 of the object 100 under examination to a data set according to various standards. The data set may be recognized as an intrinsic value of the object 100 under examination. The controller 22 may use the data set to authenticate the object 100 under examination, and may be stored (324) by recognizing as an identification (ID). In the second step authentication of the method of an object under examination, according to the example embodiments, the controller 22 may extract the data set from internal bio information of the feature points P1 through P6 of the fingerprint region of the object 100 under examination, and may use it as an user ID, and may compare the user ID with a user ID of the object 100 under examination stored in advance.

The method of authenticating an object under examination by using a fingerprint authentication system according to the example embodiments include a first step authentication in which the controller 22 may compare a fingerprint shape of the object 100 under examination with a fingerprint shape of the object 100 under examination stored in advance, and a second step authentication in which the controller 22 may compare the internal information of the object 100 under examination corresponding to feature points of the fingerprint region of the object 100 under examination. However, in a process of authenticating the object 100 under examination, rather than performing both the first step authentication (S13) and the second step authentication (S14) for every authentication, the controller 22 may selectively perform both the first step authentication (S13) and the second step authentication (S14) according to the degree of security. When the security level is relatively low, the controller 22 may perform only the first step authentication, and when the security level is relatively high, the controller 22 may perform both the first step authentication and the second step authentication. For example, when it is determined that the security level is relatively low, such as locking of mobile phones, screen locking of electronic device, or folder locking of a storage medium, the controller 22 may perform only the first step authentication. When it is determined that the security level is relatively high, such as banking, identity authentication, keep out from a system, or door security, the controller 22 may perform both the first step authentication and the second step authentication. Optionally, the controller 22 may directly perform the second step authentication without performing the first step authentication. For example, when both the codes of the signal patterns at the each of the feature points on a fingerprint region of the object 100 under examination and identification information of the object 100 under examination are stored in advance, the controller 22 may perform the second step authentication by reading internal biometric information of the object 100 under examination by applying a wave signal from the at least one signal communication unit to the feature points of the object 100 under examination without omitting the first step authentication.

The method of authenticating an object under examination by using a fingerprint authentication system according to the example embodiments may include determining of which fingerprint authentication system of the first step authentication (S13) and the second step authentication (S14) will be used for authenticating the object 100 under examination according to the degree of security. When the security level is relatively low, the controller 22 may perform the fingerprint authentication of the object 100 under examination by using only the first step authentication. When the security level is relatively high, the controller 22 may perform the fingerprint authentication of the object 100 under examination by using both the first step authentication and the second step authentication, or may perform only the second step authentication by omitting the first step authentication. When the controller 22 performs only the second step authentication, internal biometric information of the object 100 under examination may be measured in the fingerprint recognition operation (S11) of the object 100 under examination, and the pattern processing (S12) and the first step authentication may be omitted.

Also, in the method of authenticating an object under examination by using a fingerprint authentication system according to the example embodiments, as described above, the controller 22 extracts signal pattern codes by measuring reflection wave signals with respect to each of the feature points P1 through P6 of a fingerprint of the object 100 under examination. However, the example embodiments are not limited thereto, the controller 22 may configure a data set of signal pattern codes by extracting internal biometric information with respect to all of a fingerprint region of the object 100 under examination besides the feature points. However, a reduced amount of data treatment in comparison to a high security level may be achieved by using the internal biometric information for authenticating an object under examination after measuring the internal biometric information with respect to the feature points of the object 100 under examination. In order to perform the first step authentication and the second step authentication, the controller 22 may perform a process of measuring a reflection wave signal by applying ultrasonic waves, optical ultrasonic waves, or RF to the object 100 under examination once or twice.

The fingerprint authentication system and the method of authenticating an object under examination by using the fingerprint authentication system according to the example embodiments may be applied to various devices for personal identity authentications, and may be applied to any devices, for example, mobile devices wearable devices without limitations.

In the fingerprint authentication system and the method of authenticating an object under examination by using the fingerprint authentication system according to the example embodiments, a fingerprint of a surface and internal biometric information of the object under examination are measured by using a wave signal applied to the object under examination from at least one of single communication unit of a fingerprint sensor. Thus, a stepwise authentication of identity of the object under examination can be performed to limit forging.

The fingerprint authentication system and the method of authenticating an object under examination by using the fingerprint authentication system according to example embodiments may be widely applied to fields that need security.

According to the fingerprint authentication system and the method of authenticating an object under examination by using the fingerprint authentication system according to the example embodiments, it is possible to obtain internal biometric information of feature points of the object under examination, and to set data base for authenticating identity of the object under examination, thus, the identity of the object under examination may be authenticated with a treatment of a small amount data when compared to the high level of security.

While one or more example embodiments have been described with reference to the figures, it will be understood by those of ordinary skill in the art that various changes in form and details may be made therein without departing from the spirit and scope of the disclosure as defined by the following claims.

What is claimed is:

1. A method of authenticating an object under examination, the method comprises:
    recognizing a fingerprint of the object under examination; and
    performing authentication on the fingerprint, the authentication including one or more of a first authentication operation to authenticate a shape of the fingerprint, and a second authentication operation to detect internal biometric information of the object under examination.

2. The method of claim 1, wherein the recognizing comprises:
    measuring a reflection wave signal reflected from the object under examination by applying a wave signal to the object under examination.

3. The method of claim 2, further comprising:
    pattern processing a pattern of the fingerprint to simplify the shape of the fingerprint of the object under examination using the reflection wave signal.

4. The method of claim 3, wherein the pattern processing comprises:
    one or more of smoothing, binarization, and thinning the pattern.

5. The method of claim 1, wherein the second authentication operation includes measuring a reflection wave signal from an interior of the object under examination after applying a wave signal to the object under examination.

6. The method of claim 5, wherein the reflection wave signal is a wave signal reflected at blood vessels, fat, or bones of the interior of the object under examination.

7. The method of claim 5, wherein performing of the second authentication operation comprises:
    detecting internal biometric information of the object under examination using the reflection wave signal; and
    comparing a data set configured by coding wave signal patterns using the reflection wave signals with a data set stored in a memory device.

8. The method of claim 1, wherein the second authentication operation is performed with respect to feature points of the fingerprint region of the object under examination.

9. The method of claim 8, wherein the feature points are one or more of ridge, valley, ending point, bifurcation, upper core, lower core, or lift (right delta) of the fingerprint.

10. The method of claim 1, further comprises:
    determining whether the object under examination is authenticated using one or more of the first authentication operation and the second authentication operation.

11. The method of claim 10, wherein
    the recognizing includes measuring biometric information of an interior of the fingerprint of the object under examination, and
    the determining determines whether the object under examination is authenticate using only the second authentication operation from among the first authentication operation and the second authentication operation.

12. The method of claim 10, wherein the determining comprises:
    performing the first authentication operation; and
    performing the second authentication operation in response to the first authentication operation being successful.

* * * * *